United States Patent [19]

Briney et al.

[11] Patent Number: 4,606,132

[45] Date of Patent: Aug. 19, 1986

[54] DIGITAL ELECTRONIC INCLINATION GAUGE

[75] Inventors: Michael S. Briney, Mesa; Jeffrey C. Heidel, Phoenix; Harold L. Swartz, Glendale, all of Ariz.

[73] Assignee: Sperry Corporation, New York, N.Y.

[21] Appl. No.: 705,948

[22] Filed: Feb. 26, 1985

[51] Int. Cl.[4] ............................................. G01C 9/06
[52] U.S. Cl. .................................................... 33/366
[58] Field of Search ................................. 33/1 PT, 366

[56] References Cited

U.S. PATENT DOCUMENTS

| | | | |
|---|---|---|---|
| 4,077,132 | 3/1978 | Erickson | 33/366 |
| 4,346,363 | 8/1982 | Wilhelmson | 33/366 |
| 4,377,912 | 3/1983 | Hakhverdian | 33/366 |
| 4,430,803 | 2/1984 | Flanders | 33/366 |
| 4,547,972 | 10/1985 | Heidel et al. | 33/366 |

FOREIGN PATENT DOCUMENTS

| | | | |
|---|---|---|---|
| 123460 | 10/1984 | European Pat. Off. | 33/366 |
| 72006 | 5/1982 | Japan | 33/366 |

*Primary Examiner*—Richard R. Stearns
*Attorney, Agent, or Firm*—Howard P. Terry; Arnold L. Albin

[57] ABSTRACT

An apparatus for sensing and measuring changes in inclination and providing a digital readout. By sensing pulse width changes rather than amplitude, the apparatus provides improved immunity to instability and environmental changes. A variable frequency scale factor oscillator allows choice of readout units. Any preset angle may be selected as a zero reference. The capability is provided to hold any reading displayed for any desired period of time. An overrange indicator is actuated when the linear range of the sensor has been exceeded. Digital output signals derived from the sensor are applied to gate an angle generator which is responsive to correction factor signals to adjust the digital count in accordance with stored offset data. The digital signal count is incremented or decremented in accordance with a signal representing the sign of inclination, derived from the sensor pulse widths and applied to gate the angle generator accordingly. The resulting digital count signal and sign signal are used to energize a display driver for actuating a liquid crystal display.

22 Claims, 12 Drawing Figures

DIGITAL ELECTRONIC INCLINATION GAUGE

BACKGROUND OF THE INVENTION

1. Field of the Invention

This invention relates generally to apparatus for sensing and measuring changes in inclination, and more particularly to electronic apparatus for providing a digital readout of a capacitive inclination sensor.

2. Description of the Prior Art

Apparatus employed in the prior art for sensing and measuring changes in inclination and providing a digital readout therefor have generally relied on a bubble level type sensor of the type having an arcuate glass chamber enclosing an electrolyte with electrodes immersed therein so that an inclination of the sensor results in a change in resistance between the electrodes. By sensing the resultant change in magnitude and direction of inclination with appropriate phase and amplitude sensitive circuitry, a very high degree of sensitivity may be provided so that very small changes in inclination can be measured with high precision.

One apparatus of this type is described in U.S. Pat. No. 4,167,818, "Electronic Inclination Gauge", issued to Robert Cantarella, et al, on Sept. 18, 1979. A further such device is disclosed in U.S. Pat. No. 4,377,912, "Apparatus for Sensing and/or Measuring Changes in Inclination", issued on Mar. 29, 1983 to Armik A. Hakhverdian. However, these prior art devices depend on electrolytic levels which employ precious metal electrodes and are inherently expensive to fabricate and calibrate. Further, the circuitry required to attain a digital readout is complex and expensive, and heretofore has not allowed a user to choose between alternate readout units, depending on his application, nor to preselect a zero reference which differs from the earth's gravity vector for convenience in measuring a change in inclination of a tilted surface.

The Hakhverdian apparatus provides a sensor which presents a capacitance which is a function of its inclination. The capacitor is used as an element of an oscillator whereby a change in capacitance varies the oscillator frequency which in turn may be applied to control an indicating instrument. However, an apparatus of this type suffers from instability and temperature drift due to its analog nature and therefore is unsuitable for precision measurements of high stability.

The present apparatus is intended for use with a digital interface, of the type described in Differential Capacitance Detector Ser. No. 696,626, filed Jan. 31, 1985, by H. L. Swartz, et al, and assigned to the Assignee of the present invention. The detector described therein provides a pulsed output, wherein the pulse width is a function of the inclination of a variable capacitance sensor, and which is adaptable to an all-digital readout apparatus. Thus, the instability and sensitivity to environmental changes of the prior art are readily overcome.

SUMMARY OF THE INVENTION

According to the principles of the present invention, an inclination sensor with digital readout is provided which permits the user to choose between multiple readout units, e.g., degrees and mils, in/ft and percentage grade. Further features include the capability to select any preset angle as a zero reference, and the capability to hold any reading displayed for any desired period of time. An overrange indicator is actuated when the linear range of the sensor has been exceeded.

In particular, the digital display apparatus of the present invention is adapted for use with a gravitational sensor providing pulse signals which correspond to the direction or algebraic sign and the magnitude of inclination of the sensor with respect to a reference axis. The system includes a clock pulse generator for providing timing signals, and responds to the sensor output and by providing a gating pulse which is representative of the magnitude of inclination and signals representative of the direction of inclination. A digital counting circuit counts the number of clock pulses occurring during a period determined by the width of the gating pulse and the period of the clock pulses is selected to provide a predetermined scale factor so that the digital count signal is representative of the gate pulse width and the clock repetition rate. A reference offset angle may be inserted by storing angle data in a memory. This stored data is used to generate a correction factor signal to adjust the digital count signal such that the difference between the sensed angle and the offset angle is displayed. This is accomplished by an up/down counter which receives the uncorrected digital count signals and the correction factor signals to provide a digital count signal which represents the angular difference between the sensor inclination and the reference offset. The digital output signals are incremented or decremented according to a signal representing the algebraic sign of inclination, derived from the sensor pulse widths and applied to gate the up/down counter accordingly. The resulting digital count signal and sign signal are used to energize a display driver for actuating a digital display.

DESCRIPTION OF THE PREFERRED EMBODIMENT

Figure 1:
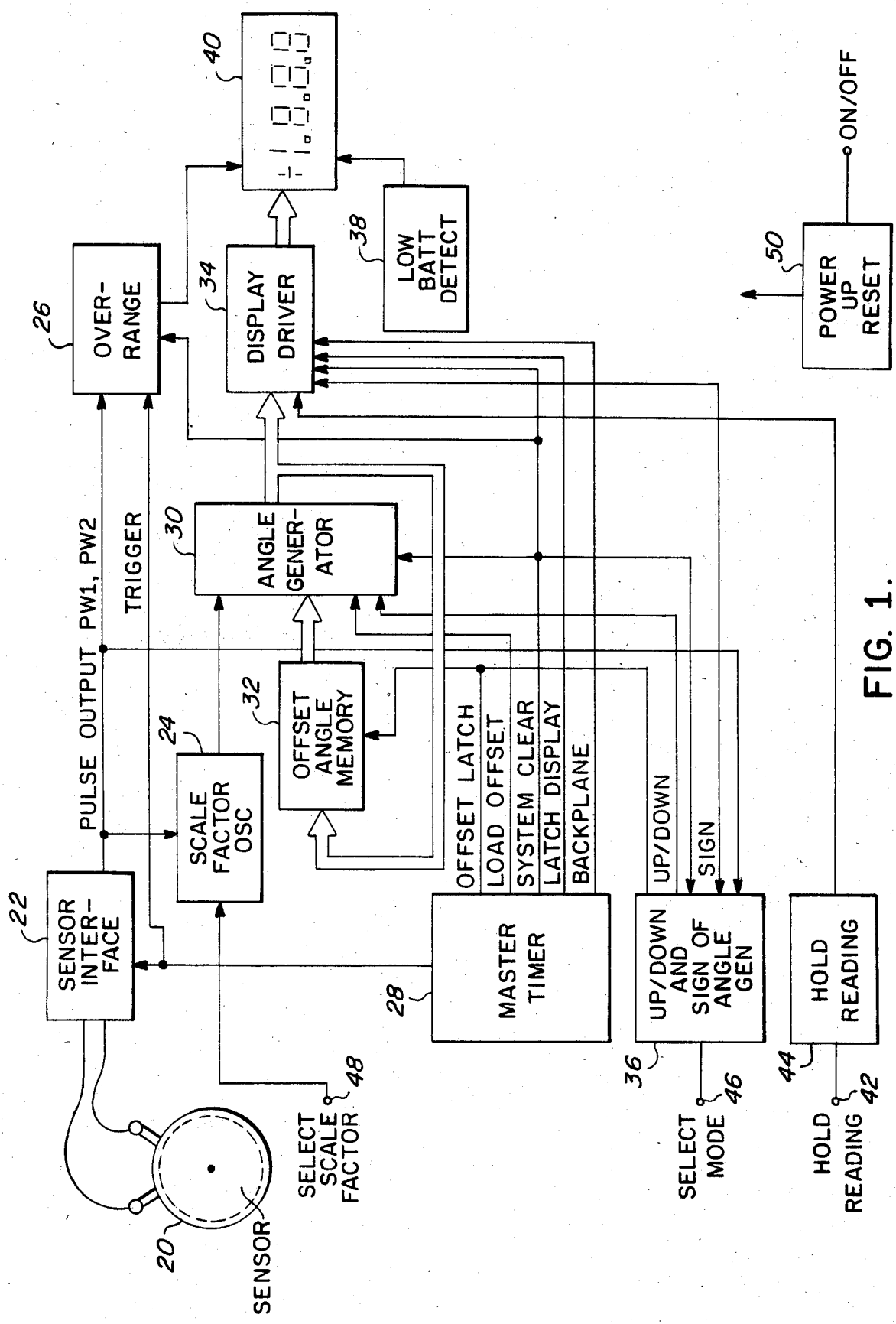
FIG. 1 is a block diagram of a preferred embodiment of the invention.

FIG. 1 is a block diagram of a preferred embodiment of the invention for processing output signals of an inclination sensor 20 and sensor interface 22. Electrical signals from the inclination sensor 20 proportional to the direction and magnitude of an inclination angle are processed in interface 22 to generate pulse-width modulated signals accordingly. The sensor 20, interface 22, and display 40 form no part of the invention and are shown here for illustrative purposes only. An oscillator 24 generates a pulse train at a rate proportional to a desired scale factor of the display. A timer 28 generates a trigger pulse which is applied to the interface 22. Oscillator 24 senses the interface signals and generates a gating pulse which is applied to angle generator 30 for a time proportional to the width of the applied interface pulses. The train of pulses is counted in angle generator 30 and a signal representative of the pulse count is applied in digital form to display driver/decoder 34, which actuates the liquid crystal elements of display 40. The apparatus includes an offset angle memory 32 for correcting the display for any predetermined angular disposition of the sensor. Circuit 36 receives the sensor pulses to provide output signals indicative of the sign of the angle of inclination thereby commanding angle generator 30 to increment or decrement its count. Other features include an overrange circuit 26 for blanking the display when a predetermined linear angular range has been exceeded. An observed reading may be latched into the display by hold reading circuit 44. Detector 38 provides a display indication when the life of an internal battery has been expended. Since the invention employs digital circuitry, logic circuit 50 sets and resets the various circuits automatically upon initial application of power. Control 42 actuates the hold reading mode. Control 46 permits selection of the normal mode, set mode for inputting an angular offset of the sensor, and alternate reference mode for reading the difference angle. Scale factor switch 48 transposes the LCD display between optional scale factors.

Figure 2:
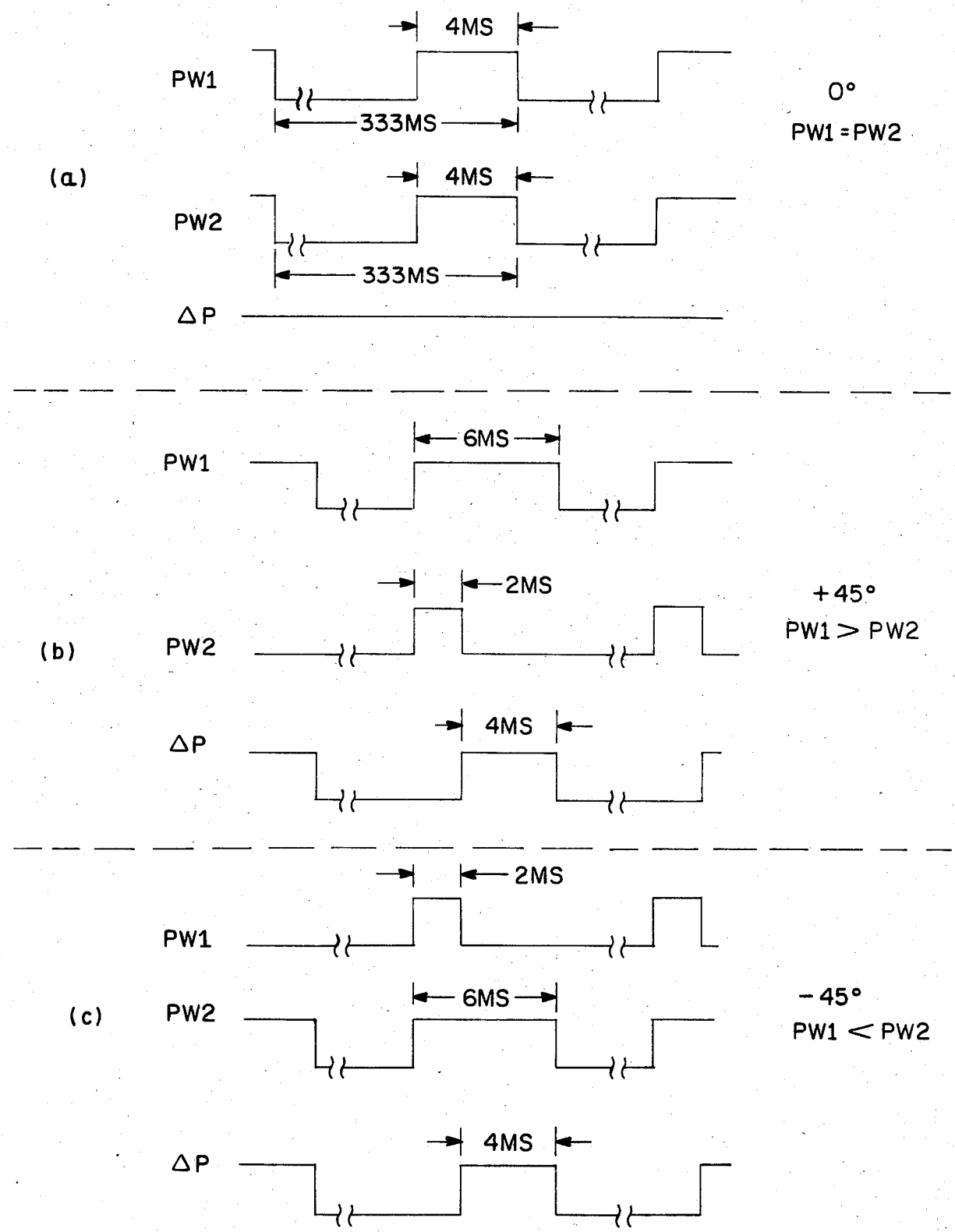
FIGS. 2(a),(b), and (c) are waveforms illustrating the pulse-width modulated output of an inclination sensor as used with the invention.

FIG. 2 represents typical electrical signals produced by sensor interface 22 for representative angular dispositions of the sensor 20. The interface 22 produces two output pulses, PW1 and PW2, whose duration is representative of the inclination of sensor 20. As the inclination of the sensor changes, a train of pulse width modulated pulses appears at the interface output terminals. The modulated pulses are phase synchronized with respect to each other as illustrated in FIG. 2. As can be seen from FIG. 2A, when the sensor axis is symmetrically aligned with respect to the earth's gravitational vector, i.e., displaced at 0°, the pulses PW1 and PW2 are of equal duration. Typically, the pulse repetition rate would be of the order of 3 Hz, thus providing a cycle duration of 333 ms. At 0°, the pulse-width of PW1 and PW2 is seen to be approximately 4 ms. as shown in FIG. 2A. The pulse widths range from approximately 2.0 ms to 7.5 ms over the useful range of sensor inclination.

Also shown in FIG. 2 is a signal ΔP, which represents the difference in duration of pulses PW1 and PW2. Since in FIG. 2A the pulses have equal duration, the value of ΔP is zero throughout the cycle. The difference pulse ΔP will be used to generate a gating pulse in a manner to be described for application to a digital counter for generating signals corresponding to the angular inclination of the sensor.

As can be seen from FIG. 2B, when the sensor is inclined at an angle of +45°, PW1 will be greater than PW2. In this example, PW1 has a duration of 6 ms, while PW2 has a duration of 2 ms, resulting in a difference pulse ΔP of 4 ms. Similarly, in FIG. 10C, where the sensor angle is −45°, PW1 is less than PW2, all the corresponding difference pulse is again 4 ms. It is clear that in order to resolve the ambiguity of the direction of inclination of the sensor, additional circuitry will be required to determine the sign of the angle.

Figure 3:
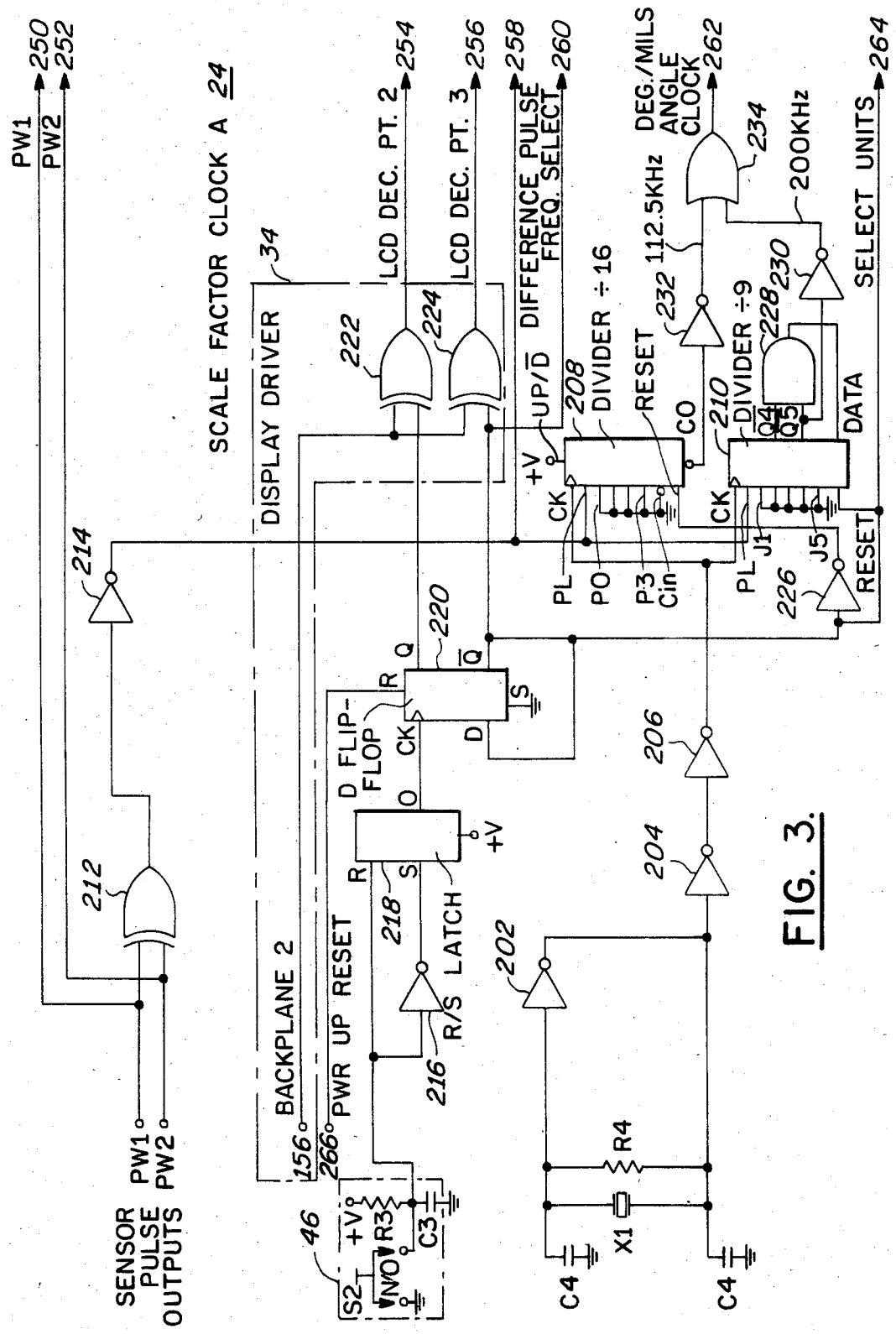
FIG. 3 is an electrical schematic circuit diagram of a scale factor clock and display driver circuits.

The input portion of the circuit of the invention is depicted in FIG. 3. An exclusive OR gate 212 has two inputs connected to receive the pulse-width modulated signals PW1 and PW2 from the sensor to generate the difference pulse ΔP. The two pulses are also applied to the sign of angle generator 36 via lines 250,252, as will be described in connection with FIG. 5.

The output of gate 212 is applied to inverter 214 to provide an exclusive NOR of PW1 and PW2. This signal comprises the difference pulse width which is used as a gating signal on line 258. It ranges from 0 ms at zero inclination to approximately 4 ms at ±45°. This pulse is used to enable the frequency dividers 208 and 210 and the dividers 604 of FIG. 4.

In order to maximize flexibility in application, the system is capable of providing an output scale in degrees, mils, inch per foot (in/ft), % grade and mm/M. The scale factor is established by the frequency of a crystal X1 and a circuit which permits deriving two scale factors therefrom. The system may optionally be provided with a second crystal oscillator circuit (X2, FIG. 4) from which an additional two scale factors may be derived. The unused crystal input may be disabled so that effectively only one crystal oscillator is operative.

For readings in degrees and mils a 1.8 MHz quartz crystal is utilized. Crystal X1, resistor R4, capacitors C4 and inverter 202 comprise a simple feedback oscillator. The output of inverter 202 is buffered through series connected inverters 204 and 206 to provide a clock pulse to frequency dividers 208 and 210. Divider 208 is comprised of a presettable up/down counter in the form of a commercially available integrated circuit chip. Divider 208 is programmed by standard techniques to be preset to provide a division of 16 by connecting the preset input terminals P0–P3 and $C_{IN}$ as indicated in FIG. 3. The preset values are parallel loaded by the occurrence of the difference pulse ΔP at terminal PL. After 16 clock pulses have been applied, the counter will output a logic high to inverter 232, which results in an output signal on line 232 at a frequency of 112.5 kHz.

Divider 210 is similarly a presettable divide-by-N counter configured to provide a divider ratio of 9 in conjunction with AND gate 228. The output $\overline{Q5}$ of divider 210 is coupled to inverter 230 to provide an output frequency of 200 kHz. The outputs of inverters 232 and 230 are coupled to OR gate 234, whereupon the one of the two divider outputs activated is provided at the gate output on line 262 as an angle clock signal appropriately scaled for the selected units display.

Switch S2 is used to select the readout units. Switch S2 has been shown for convenience as a double pole, normally open switch. A voltage +V is applied through resistor R3 to the R terminal of R-S latch 218 and through inverter 216 to the S terminal. When momentary switch S2 is depressed and released, the d.c. voltage across capacitor C3 is momentarily short circuited, bringing the R input of latch 218 to ground and the S input to a logic high. This results in providing a clock pulse to flip-flop 220.

On power up, a reset pulse on line 266 is applied to terminal R of flip-flop 220, which sets output $\overline{Q}$. The logic high applied to the reset terminal of divider 210 disables divider output $\overline{Q}5$. The logic high output $\overline{Q}$ of flip-flop 220 is also applied to inverter 226 and brings the reset terminal to a logic low, thus enabling divider 208. The output $C_O$ thereof is applied to inverter 232 and then to one terminal of OR gate 234. Since the input frequency is 1.8 MHz, division by 16 results in an output frequency of 112.5 kHz. This represents the frequency needed for the unit to provide an output reading in degrees, as will be shown below. Returning now to flip-flop 220, when a clock pulse is applied to terminal CK from latch 218, the outputs Q and $\overline{Q}$ change state. The input to the reset terminal of divider 210 is held low enabling the divide/9 counter 210. This results in an output frequency of 200 kHz, which is required to provide an output reading in mils. At the same time, the logic low applied to the input of inverter 226 results in a logic high signal applied to the reset terminal of divider 208, thereby disabling divider 208. Thus, it may be seen that switch 2 acts to alternately switch the readout units between degrees and mils.

In a similar manner, it will be shown that by appropriate choice of the oscillator frequency and divider ratios, the system may be adapted to select between a display of in/ft and % grade. As will be shown in connection with FIG. 4, the output 262 of gate 234 is provided to an OR gate 602 for one of two scale factor oscillators and associated dividers preselected by hardwiring to provide the desired display units on the LCD.

Figure 5:
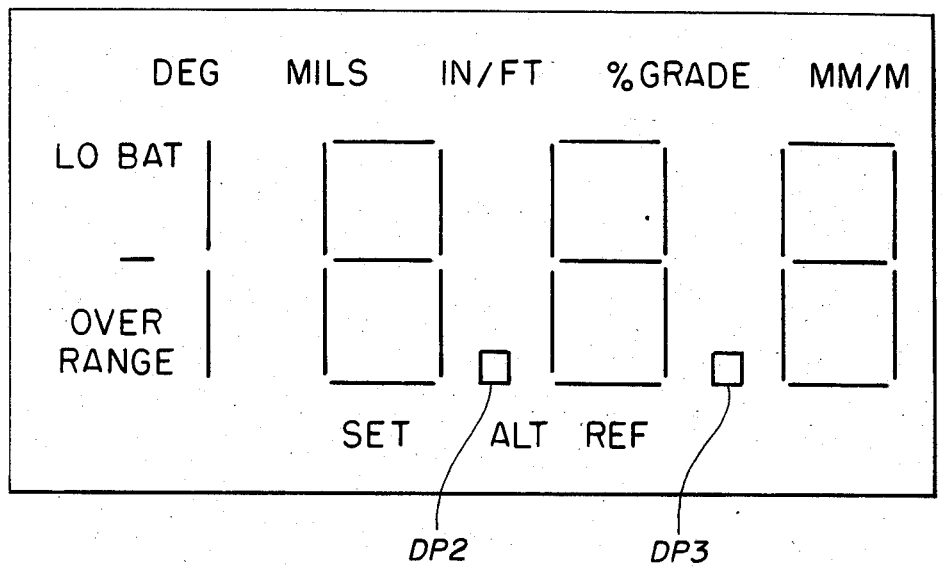
FIG. 5 shows a typical display face for a liquid crystal display customized for the present invention.
Figure 8:
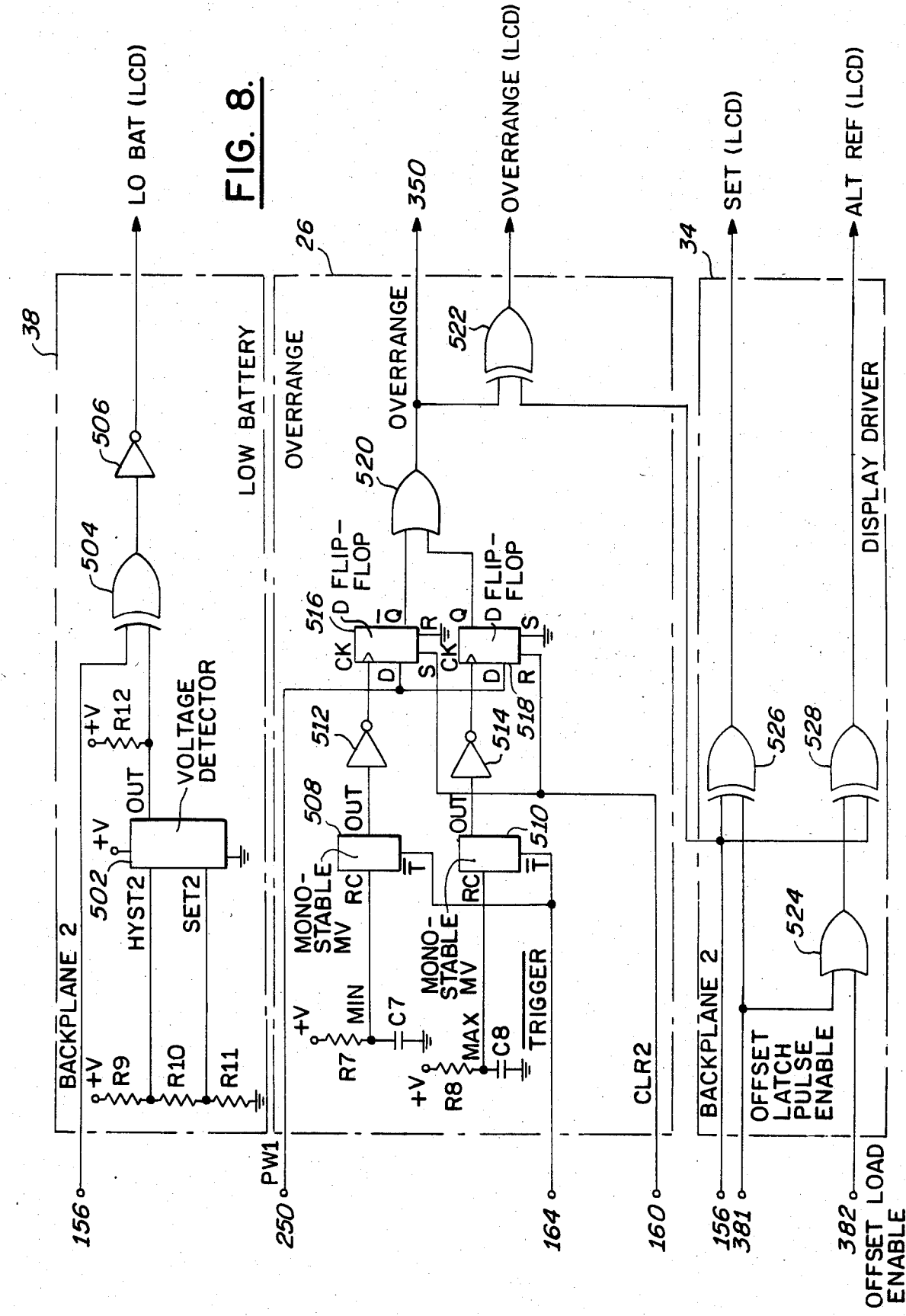
FIG. 8 is an electrical schematic circuit diagram showing the a battery voltage detection circuit, overrange indicator circuit, and LCD driver circuitry for set, offset, and overrange indicators.
Figure 9:
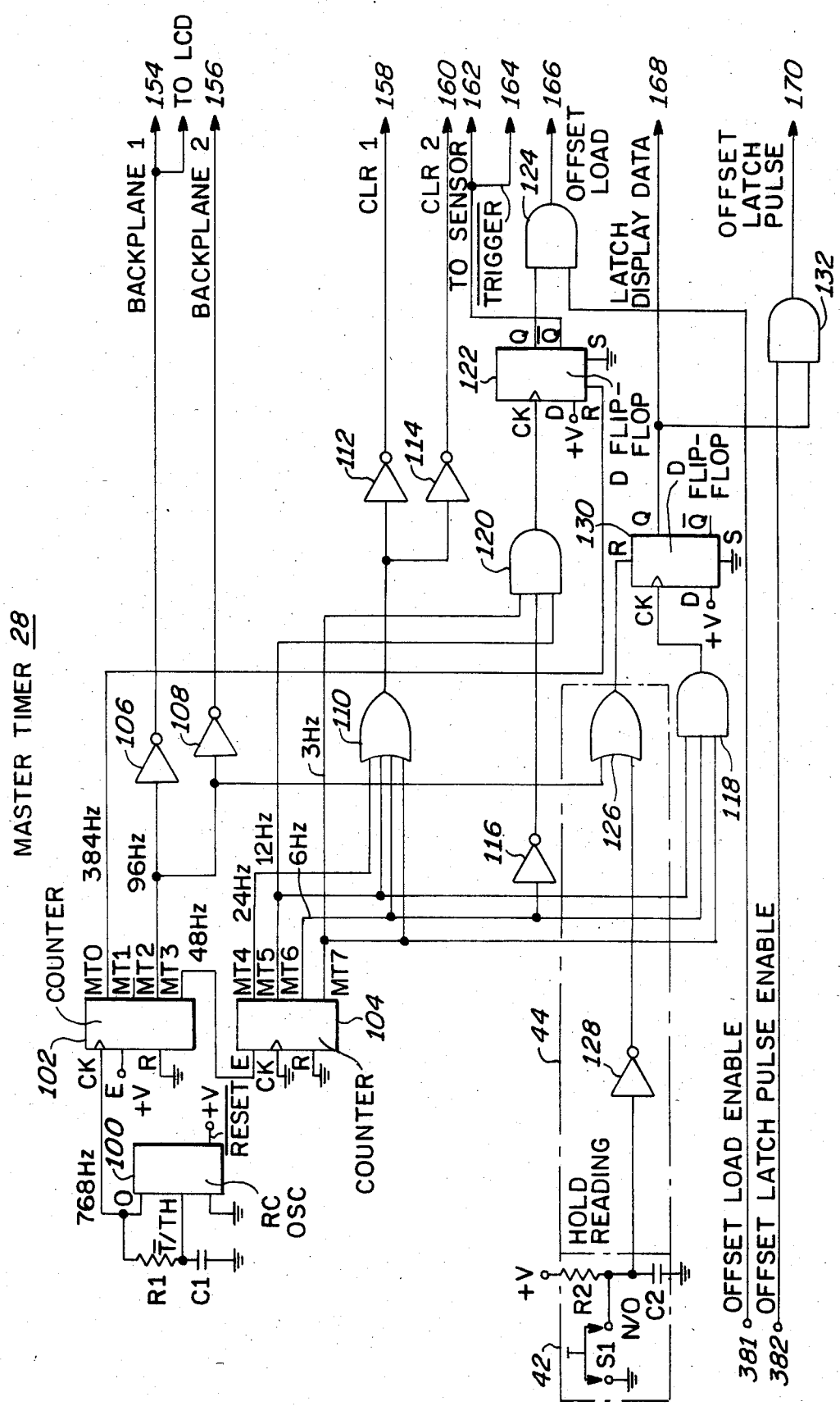
FIG. 9 is an electrical schematic circuit diagram illustrating a timing pulse generator and hold reading circuit which may be utilized in the preferred embodiment of FIG. 1.

The outputs Q and $\overline{Q}$ of flip-flop 220 are also applied to exclusive OR gates 222 and 224, respectively, to select an appropriate decimal point and scale factor legend on the display, as illustrated in Table 1 and FIG. 5.

signal. Conductive elements connected to terminals are sandwiched above the backplane, with a liquid electrolyte therebetween. When an a.c. signal out-of-phase with the referenced signal is applied to a terminal, the corresponding element is illuminated. FIG. 9 shows how backplane reference signals 154 and 156 are generated. The voltages to drive the conductive elements are derived by phase inverting the reference signal. See, for example, the low battery circuit 38 of FIG. 8. A signal 156 is applied through control gate 504 and coupled through inverter 506 to illuminate the LO BATT element. Similarly, the DP2 and DP3 signals on lines 254 and 256 of FIG. 3 may be phase inverted in a gate circuit, as shown in FIG. 8 at gates 526 and 528, and described in detail hereinafter.

It will be clear to one skilled in the art that by hardwiring the DP2 and DP3 signals to appropriate electrodes of the LCD, the LCD display may be individually adapted to a desired display configuration. The electrodes which are desired to remain inactive are wired to the reference backplane, not shown. Thus, for the mils/degree display, the mils legend of FIG. 5 will be driven by the output of DP2. The DEG legend and associated decimal point will be illuminated when driven by a signal from DP3. The unused indicators may be hardwired to the backplane reference, and thus inactivated. In the configuration providing in/ft and % grade displays, the left-most decimal point and the in/ft legend will be simultaneously illuminated by signal DP2, while the % grade and associated decimal point will be illuminated when energized by the signal DP3. In a third configuration, in which the in/ft and mm/M scale factors are utilized, the in/ft legend will be illuminated along with the associated decimal point thereunder by the signal from DP2, while the mm/M legend will be illuminated along with the right-most decimal point by the signal from DP3.

It may be seen from FIG. 3 that the difference signal applied by inverter 214 to dividers 208 and 210 will

TABLE I

| | | | ANNUNCIATOR LOGIC | | | | | |
|---|---|---|---|---|---|---|---|---|
| MILS AND DEG | | | IN/FT AND % GRADE | | | IN/FT AND CM/M | | |
| DEG | DP3 | (ON) | DEG | BP2 | (OFF) | DEG | BP2 | (OFF) |
| MILS | DP2 | (ON) | MILS | BP2 | (OFF) | MILS | BP2 | (OFF) |
| IN/FT | BP2 | (OFF) | IN/FT | DP2 | (ON) | IN/FT | DP2 | (ON) |
| % GRADE | BP2 | (OFF) | % GRADE | DP3 | (ON) | % GRADE | BP2 | (OFF) |
| MM/M | BP2 | (OFF) | MM/M | BP2 | (OFF) | MM/M | DP3 | (ON) |

The "decimal point" drivers are also used to energize the indicator annunciator legends. In the in/ft mode, the decimal point (DP2) below the in/ft symbol is illuminated, and there are two digits to the right of the decimal. In the DEG mode and % grade mode the decimal point (DP3) falls below the % grade indicator and there is one digit to the right of the decimal point. In the mils and mm/M modes, no decimal point will be illuminated. Since XOR gate 222 (FIG. 3) is coupled at its inputs to the 96 Hz backplane pulse BP2 and to the Q output of flip-flop 220, DP2, line 254 will be pulsed at a 96 Hz rate in phase with BP2 when the Q output is held at a logic low and 180° out of phase with BP2 when the Q output is held at logic high. In a like manner, XOR gate 224 will provide a pulsed output to DP3, line 256. Since Q and $\overline{Q}$ are complementary outputs, only one of the two decimal point drivers coupled thereto will be energized at any time.

The liquid crystal display is comprised of a conductive backplane which is excited by an a.c. reference enable the dividers for a period of time proportional to the difference between the sensor output pulses PW1 and PW2. Thus, for the 1.8 MHz oscillator, a series of output pulses is provided at OR gate 234 which is representative of the angular displacement of the sensor in either degrees or mils as determined by operation of Switch S2.

Figure 4:
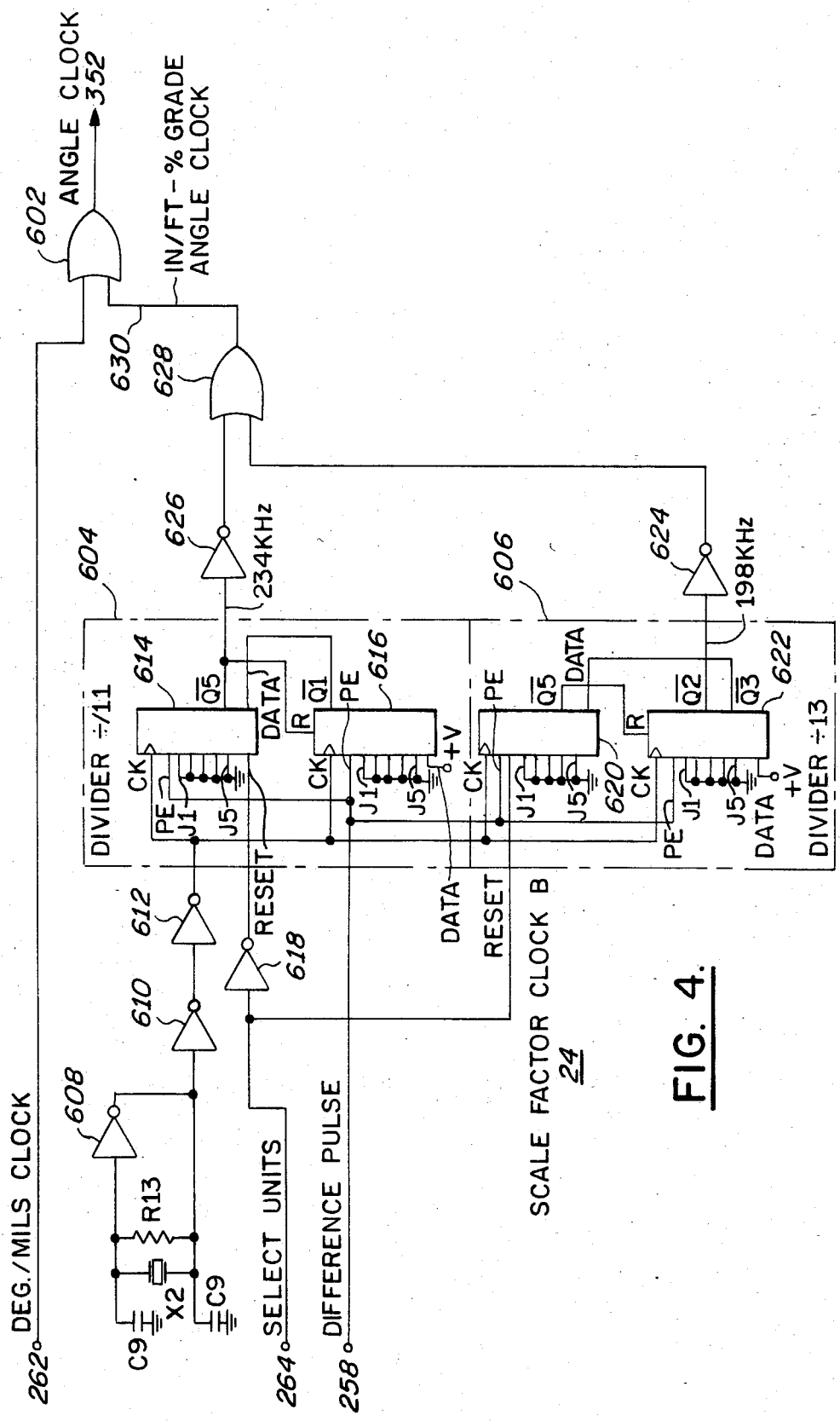
FIG. 4 is an electrical circuit schematic diagram of an optional scale factor clock.

Referring now to FIG. 4, with continued reference to FIG. 3, a "select units" control signal from terminal Q of flip-flop 220 is also applied via line 264 to the input of inverter 618 and to divider 620 of divider network 606. An alternate scale factor clock B operating with a crystal frequency of 2.574 MHz provides an angle clock signal 630 to OR gate 602 in in/ft or % grade. Crystal X2 in combination with capacitors C9, resistor R13, and inverter 608 comprises a 2.564 MHz oscillator.

The output of inverter 608 is buffered through inverters 610 and 612 to provide a clock signal to dividers 614, 616, 620, and 622. Any one of various commercially available programmable counters are suitable for the dividers. When enabled by the difference pulse on line 258 to terminal PE cascaded dividers 614 and 616 will generate a 234 kHz output signal which is applied to inverter 626. Similarly, cascaded dividers 620 and 622 will provide a 198 kHz output pulse to inverter 624. Since the outputs of inverters 624 and 626 are coupled to the inputs of OR gate 628, an angle clock signal representing the in/ft scale at 234 kHz or the % grade scale at 198 kHz will be coupled on line 630 to OR gate 602. As in the discussion with respect to the scale factor clock of FIG. 3, S2 will provide a select units pulse on line 264 to energize one of the two available angle clock frequencies by providing a set or reset signal in complementary fashion to dividers 614 and 620. The selected clock signal will then be available at the input of OR gate 602, as well as a degree/mils clock signal on line 262. In the system described, no software switch is provided to select between the outputs of gates 234 and 628. Therefore, one of the crystal oscillators must be disabled, such as by grounding the crystal terminals, which selection is made by considering the intended application of the instrument and installing the desired modification during assembly.

The output of OR gate 602 is coupled on line 352 to angle generator 30 whose function will now be described with reference to FIG. 6.

Angle generator 30 is comprised of counter elements 308, 310, 312, and 314, which provide a thirteen bit, up/down, decade counter with reset and preset capabilities. Such counter element includes an up/down input terminal and counts in a direction determined by the logic level of the signal applied thereto. In the normal and set offset modes, the angle generator counter always counts up. For the offset mode, the direction of count is determined by a comparison of the sign of the offset angle with the sign of the new angle with respect to the earth's gravity vector. This count may be up, down, or a combination of up and down sequences.

A clock pulse applied to the CK terminal by the angle clock signal on line 352 serves to increase or decrease the count existing in the counter depending upon the logic level at the up/down terminals when the clock pulse occurs. In this manner, the count increases for one direction of inclination of the sensor, and decreases for the opposite direction of inclination of the sensor. When it is desired to measure the inclination of the sensor with respect to a predetermined offset angle, a load offset pulse on line 166 is applied to the PL terminals to enable a preset count to be loaded into counters 308, 310, 312, and 314. The offset count signals are parallel loaded into terminals P0–P3 from the offset angle memory 32 in a manner to be described. A clear signal CLR 1 is applied to the reset terminals of each counter to reset the counter to zero at the start of each count cycle. The outputs from terminals O0–O3 of the counter elements are applied to multiplexer 302 and will ultimately be applied to drive the LCD. The output O0 from counter element 314 is used to energize the most significant bit (MSB) of the LCD, which appears as a vertical bar in FIG. 5. The output signals from all counter elements are also applied to offset angle memory 32 via lines 384–399.

Multiplexer 302 is comprised of three two-line to one-line data selectors 322, 324, 326, each of which routes one of two four-bit signals representative of the angle count and overrange indication applied to the inputs to a four bit output. Inputs A0–A3 are coupled to receive the angle count of the respective counters 308, 310, 312, and 314. Inputs B0–B3 are connected to a logic high. The strobe input D/S is grounded to enable the device. Terminals D0–D3 provide the four bit output signal. $\bar{a}/b$ is the data select terminal. During the count cycle within the linear range of the sensor, the $\bar{a}/b$ terminals are held low, thereby transferring the count signals on terminals A0–A3 to the output terminals D0–D3. When an overrange signal is received on line 350 indicating the linear range of the sensor has been exceeded, then terminal $\bar{a}/b$ is driven to a logic high, transferring the signals on B0–B3 to the output terminals D0–D3, which will result in blanking the LCD display.

The count appearing at terminals D0–D3 is then coupled to decoder/driver 304 and latched into seven segment display drivers 322, 324, and 326 on occurrence of a latch display data pulse on line 168 applied to the latch terminal L of the decoders. Decoders 322–326 preserve the count until updated on the following count cycle. Decoders 322–326 must be capable of a storage latch function and of accepting a four bit input signal for energizing a seven segment LCD display. The latched section, for example, may be comprised of RS flip-flops, while the decoder section may use a read only memory with the binary input acting as an address. The word stored in memory is then the equivalent of the seven-segment display. The decoder outputs 384 $a$–$u$ are coupled to the LCD segments of FIG. 5 in a conventional manner. A suitable decoder/driver chip for this application is the RCA CD 4056A/DE. Other integrated circuits with similar properties may also be utilized.

Figure 6:
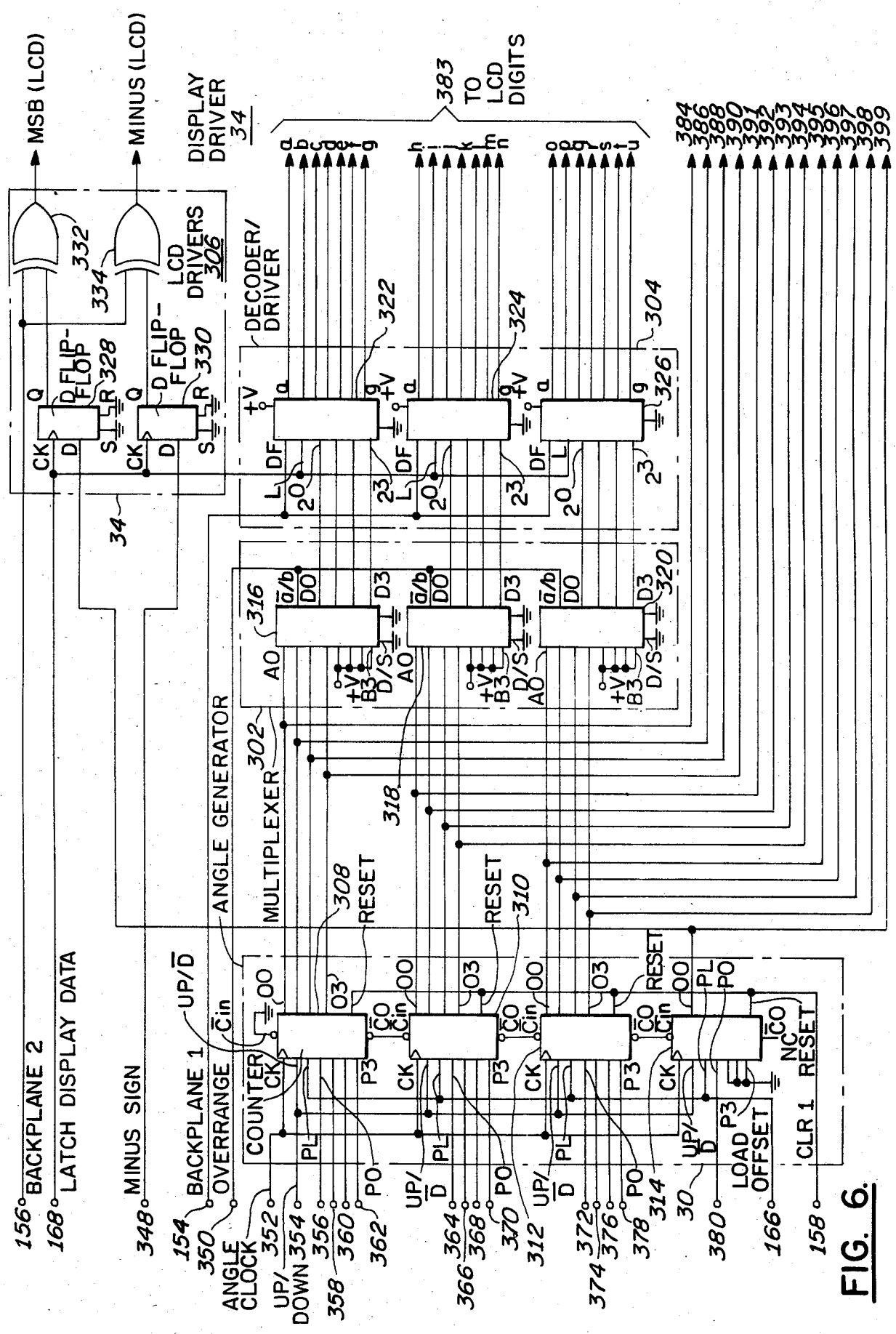
FIG. 6 is an electrical schematic circuit diagram of angle generator counters, a multiplexer, display decoder/drivers, and LCD drivers useful in the preferred embodiment.

FIG. 6 also shows the circuitry for driving the MSB and minus sign elements. The MSB, shown as the numeral 1 in FIG. 5, and the minus sign are latched the same time by D flip-flops 328 and 330 on receipt of the latch data display pulse 168. Thus, flip-flop 328 is enabled at the time the seven-segment display of the LCD is energized. A data signal is provided by the O0 output of counter 314 when the count exceeds the 3-digit range of the seven-segment digital displays. When data signal O0 is high, flip-flop 328 will be triggered by the clock signal applied to input CK resulting in a logic high at the Q output. The Q output is coupled to one input of exclusive OR gate 322, while the backplane 2 signal is coupled on line 156 to a second input of the gate. Since the backplane 2 signal on line 156 is pulsing at a 96 Hz rate, the output of XOR gate 332 will also pulse at 96 Hz; the signal phase will be controlled by the Q output of flip-flop 328. A logic high at the Q output will result in a 180° out-of-phase signal with respect to BP2 being applied to the MSB indicator of the LCD and hence it will be illuminated; a logic low will cause the signal to be in phase with the backplane signal, and hence it will be extinguished.

D flip-flop 330 and XOR gate 334 operate in a similar manner. A minus sign data signal is applied on line 348 from the sign of angle generator 36 to flip-flop 330, a logic high signifying a minus condition. The clock signal on line 168 triggers the Q output during the presence of the minus sign high on terminal D. The signal from the Q output and the backplane 2 signal coupled to respective inputs of XCR gate 334 which is then coupled to activate the minus sign indicator of the LCD when the output of gate 334 is out of phase with respect to BP2, and extinguish the minus sign when the output is in phase with BP2.

If the signal on line 350 is a logic high, indicating that the linear range of the sensor has been exceeded, multiplexers 316,318 and 320 will output an all ONES count to the seven-segment display drivers 322, 324, and 326, which forces the LCD into a blank condition, indicating to the user that the sensor is in an overrange condition.

Figure 7:
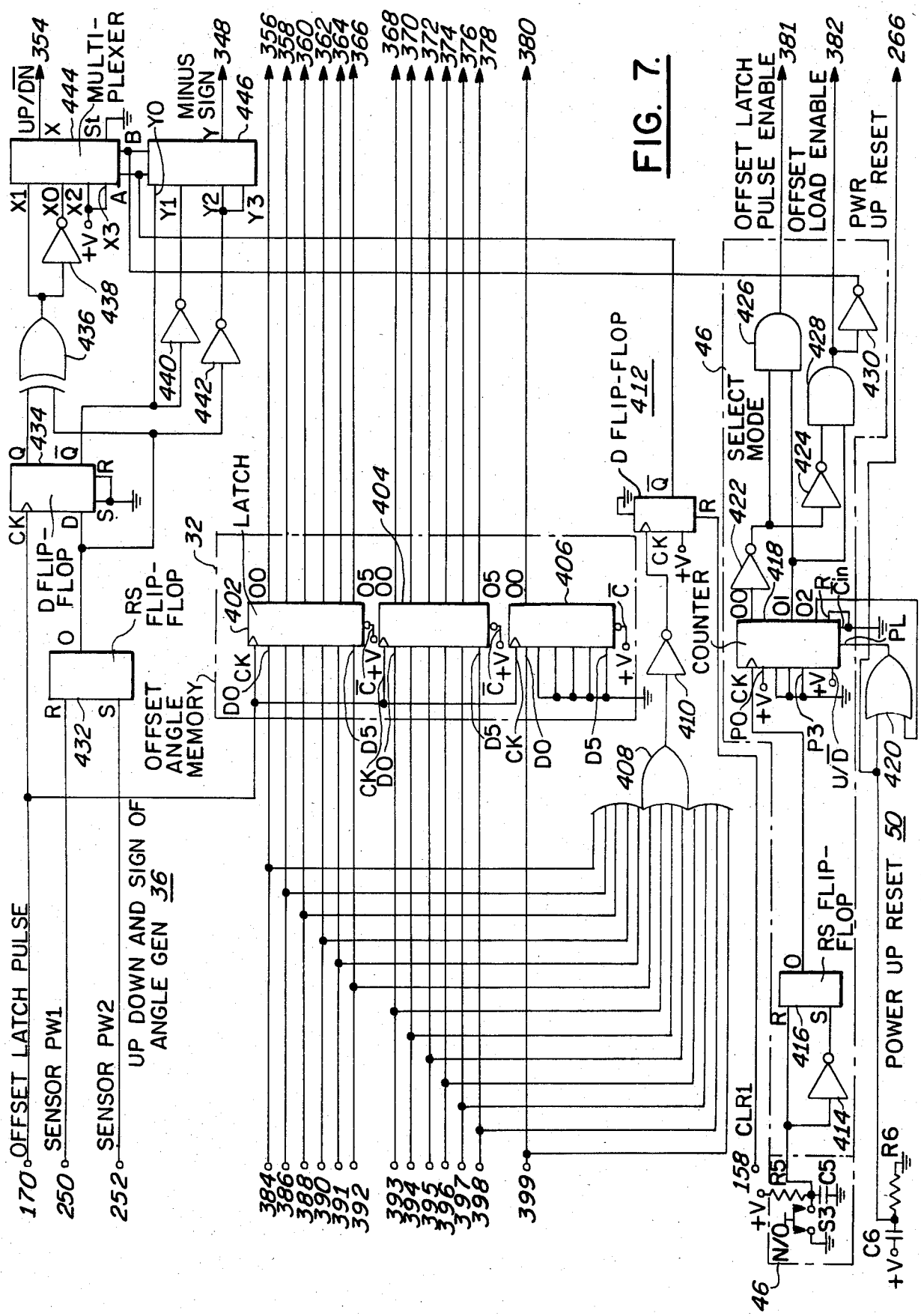
FIG. 7 is an electrical circuit schematic diagram showing an angle memory, power up reset, up/down and sign of angle generator, and offset mode switching circuitry.

Referring now to FIG. 7, offset angle memory 32 comprises an angle data store for receiving signals representative of an offset angle and applying those signals to increment or decrement the angle generator count. Switch S3 allows the user to select between three modes of operation. Before depressing the switch, the apparatus is in the "normal" mode. In this mode, the angular displacement of the sensor is measured with respect to the earth's gravity vector, i.e., the true vertical. When S3 is depressed and released to obtain the "set offset" mode, an existing value displayed on the LCD will be stored into offset latches 402, 404, and 406. When switch S3 is again depressed and released, the apparatus is placed in the "offset" mode. The value previously stored in the memory is then loaded into angle generator 30 as a preset value with the result that the LCD displays the difference between the present inclination of the sensor and the previously stored offset value.

In general, S3 serves to generate a clock pulse to trigger the counter 418 each time the switch is depressed and released. The counter then sequentially cycles the select mode circuit 46 through the normal, set offset, offset, and back to normal modes for each successive operation of S3. In the normal mode, the R terminal of RS flip-flop 416 is high and the S terminal is low. The 0 output is low, thus, there is a logic low at the clock input of counter 418. Counter 418 is a conventional counter with preset, reset and up/down counting capabilities as previously described. Since counter 418 is reset upon initial application of power, the output is a binary word 001, corresponding to the state of terminals P0–P2. Inverter 422 coupled to O0 provides a logic low to AND gate 426 while output O1 provides a logic low to a second input of AND gate 426, hence the offset latch pulse enable is at a logic low. Further, the logic high output from inverter 422 when applied through inverter 424 and the logic low from terminal 01 of counter 418 to AND gate 428 result in a similar manner in a logic low on offset load enable line 382. Therefore, the offset load enable line is also disabled.

When S3 is depressed for the set offset mode, flip-flop 416 is set and provides a logic high at the CK input of counter 418. Counter 418 is incremented and provides a binary word output of 010. Since the input to AND gate 426 is now 1,1, the offset latch pulse on line 381 is enabled. The input to AND gate 428 being 0,1, the offset load enable line remains inactive. The offset latch pulse enable signal is thereafter coupled to AND gate 132, as shown in FIG. 9. The offset latch pulse developed on line 170 is then received as a clock pulse at latches 402, 404, and 406 so that the values coupled to the latched inputs are thereby stored as displayed on the LCD.

When S3 is again activated to obtain the offset mode, the clock pulse to counter 418 advances the output count to binary word 011. This count turns off offset latch pulse gate 426 and enables offset load gate 428 to provide the offset load enable pulse on line 382 to gate 124, all as shown on FIG. 9. The load offset pulse thereby generated by D flip-flop 122 parallel loads the values previously latched into offset latches 402, 404, and 406 into angle generator 30 when the offset load enable signal is high. Simultaneously, the logic high at terminal 02 is coupled to OR gate 420 and applies a logic high to the parallel load terminal PL. This resets the counter by transferring the values loaded into P0–P3 to terminals O0–O2 to reset the counter to the normal state on the next clock pulse from switch S3.

Referring now to the sign of angle generator, sensor interface signals PW1 and PW2 are coupled to the inputs of an R-S flip-flop 432. The 0 output is connected to the data input of type D flip-flop 434, which receives the offset latch pulse on line 170 as a clock pulse. The 0 output of flip-flop 432 is coupled to inverter 442 which feeds the Y2, Y3 inputs of a four input-to-one output multiplexer 446. The $\overline{Q}$ output of flip-flop 434 provides an inverse sign signal to terminal Y0 of multiplexer 446 and is also coupled to inverter 440 to provide a non-inverted sign of the angle to terminal Y1. The Y output of the multiplexer provides the sign of the angle or "minus" signal to line 348.

In the normal mode and set offset mode the sign of the angle is detected by R-S flip-flop 432, which compares PW1 on line 250 and PW2 on line 252 from the sensor to determine which pulse width remains high for the longest period of time (see FIG. 2). If PW1 is high longer than PW2, which occurs when the inclination angle is positive, then R=1 and S=0 and 0 output will be zero. If PW2 has a greater pulse width than PW1, which occurs with a negative angle of inclination, then R=0 and S=1, resulting in a logic high at the 0 output. But the 0 output of flip-flop 432 is coupled through inverter 442 to multiplexer 446. Since the 0 output is inverted, the minus sign signal on line 348 will be a logic high for a negative inclination and a logic low for a positive inclination.

Multiplexers 444 and 446 are controlled by signals on terminals A and B which are derived from an "all zeros" signal and the offset load enable signal, respectively. In the normal mode, the offset load enable signal 382 is a logic low. Since this signal is coupled through inverter 430 to terminal B of the multiplexers, the result is that in normal mode B is always set at a logic high. Similarly, in the set offset mode, terminal B remains at a logic high. Terminal A is driven by a $\overline{Q}$ signal from D flip-flop 412. Since the $\overline{Q}$ output of flip-flop 412 is a logic low for all conditions other than the "all zeros" condition, terminal A will be at a logic high. A Truth Table for multiplexers 446 and 444 is shown in Table II.

TABLE II

| MULTIPLEXER TRUTH TABLES | | | | | | | |
|---|---|---|---|---|---|---|---|
| | 446 | | | | 444 | | |
| MODE | B | A | Y | MODE | B | A | X |
| ALL ZEROS | 0 | 0 | $Y_0$ | ALL ZEROS | 0 | 0 | $X_0$ |
| OFFSET | | | | OFFSET | | | |
| OFFSET | 0 | 1 | $Y_1$ | OFFSET | 0 | 1 | $X_1$ |
| NORMAL SET OFFSET | 1 | 0 | $Y_2$ | NORMAL SET OFFSET | 1 | 0 | $X_2$ |
| NORMAL SET OFFSET | 1 | 1 | $Y_3$ | NORMAL SET OFFSET | 1 | 1 | $X_3$ |

The logic of the multiplexers is so arranged that in the normal and set offset modes, the sign signal coupled from inverter 442 to terminals Y2,Y3 of multiplexer 446 will be coupled to the Y output and appear on line 348. In the offset mode, terminal B is brought to a logic low by virtue of the logic high applied to the input of inverter 430. In that condition, the sign of the angle displayed is determined by the signal appearing at terminal Y1 which is coupled to output Y. The output of $\overline{Q}$ of D flip-flop 434 is an inverse sign of the offset angle. However, when an all zero condition occurs at the angle generator 30 output, terminal A of the multiplexers is set to a logic low. In that case, the signal from $\overline{Q}$ of flip-flop 434 is coupled from terminal Y0 to terminal Y of multiplexer 446. Here, the sign is the inverse of the offset angle.

OR gate 408 provides a logic low output in the all zero's condition. The output of gate 408 is coupled to inverter 410 and provides a clock pulse to D flip-flop 412. The $\overline{Q}$ output of flip-flop 412 is coupled to terminal A of muiltiplexers 444 and 446 where it is used to select between inputs Y0–Y3 of multiplexer 446. The minus sign output Y is then coupled on line 348 to LCD driver 34 as shown in FIG. 6.

The up/down signal 354 is generated by D flip-flop 434, XOR gate 436, inverter 438, and multiplexer 444. The up/down signal 354 controls the direction of counting for the angle generator 30 (FIG. 6). In the normal and set offset mode, the output X is coupled to X2 or X3, since B is a logic high, and the up/down signal is always logic high, thereby commanding the angle generator counter to increment.

In the offset mode, the signal up/down is derived by comparing the sign of the offset angle previously latched in flip-flop 434 with the sign of the new angle with respect to earth's gravity vector at XOR gate 436. If the signs are the same, the up/down signal is held at logic low resulting in decrementing the angle counter, unless an all zeros condition is detected, in which case the signal is brought to a logic high directing the angle counter 30 to increment. If the comparison detects that the sign of the two angles is opposite, then the up/down signal is switched to logic high, providing an incrementing count.

The sign of the offset angle, which is derived from flip-flop 432 in a manner previously described, is latched into flip-flop 434 by the offset latch pulse on line 170. Thus, the sign of the offset angle appears at terminal Q of flip-flop 434 and one input terminal of XOR gate 436 and the inverse sign is coupled to X1 of multiplexer 444 through inverter 438.

On activation of the offset mode, the new angular information on lines 250 and 252 is detected by flip-flop 432 and coupled to a second input of XOR gate 436. The output gate 436 is coupled to terminal X1 of multiplexer 444. The signal is also inverted in inverter 438 and coupled to terminal X0.

In the normal and set offset mode, the signal at terminal B is a logic high and the signal at terminal A is also a logic high. As seen in Table II, the logic of multiplexer 444 is so arranged that for the non-zero condition, input X3 is coupled to terminal X so that the sign of the up/down signal is always high. If an all-zeros condition occurs at the angle generator, then the signal at terminal A will be a logic low, resulting in coupling of terminal X2 to terminal X, maintaining the logic high condition since both X2 and X3 are coupled to a dc source.

In the offset mode, terminal B of multiplexer 444 is at a logic low, so that the signal from terminal X1 is coupled to terminal X. This provides a logic low on line 354 resulting in decrementing the angle counter. If an all-zeros condition is detected during the count, then terminal A is reset to a logic low. The output signal of inverter 438, which is a logic high, is coupled to terminal X and then to line 354 so that the angle counter is urged to increment. Where the signal inputs to XOR gate 436 are different, then the output signal is high, resulting in a count increment. Thus, depending on the relative magnitude and direction of the offset and new angles, the counter will be urged to increment, decrement or both increment and decrement where the angle signs are the same to provide the magnitude of the difference angle.

With continued reference to FIGS. 6 and 7, the offset angle memory 32 is comprised of latches 402, 404, 406 for storing angular data therein in binary form. The inputs D0–D5 of latches 402 and 404 and D0 of latch 406 are coupled to receive binary signals from angle generator 30, lines 384 through 399. The clock inputs are coupled to receive the offset latch pulse on line 170. The memory thereby comprises a thirteen bit angle data store. The output of the latches 402, 404, 406 is coupled to the respective inputs of angle generator 30, counters 308, 310, 312 and 314. Thus, angle generator 30 in the normal mode counts all the pulses of the angle clock 24. However, signals from the memory 32 also address the angle generator 30 in the set offset mode in the following manner.

At the start of each cycle, the clear signal CLR 1 resets the counters of angle generator 30 to zero. When the difference pulse 258 is active, the angle generator counts all the pulses of the angle clock 24. At the end of the difference pulse, the counts stored in the angle generator represent the angular displacement to be displayed. This count then passes through the multiplexer 302 where it is latched into decoder 304 by the latched display pulse on line 168. The most significant bit (MSB) and sign of the angle are also latched at the same time in flip-flops 328 and 330, respectively. In the normal mode, the angular displacement measured is with respect to zero, i.e., with respect to the earth's gravity vector. These values also address and continually update the latches of memory 32. In the set offset mode, the offset latch pulse on line 170 is coupled to the clock inputs of the latches, thereby causing the values presently displayed on the LCD to be latched into the offset latches 402, 404, and 406. When the apparatus is then placed in the offset mode, the value previously latched into the offset latches is coupled into the preset inputs P0–P3 of counters 308, 310, 312, and to input P0 of counter 413 of angle generator 30. This offset value is parallel loaded into the angle generator counters by the load offset pulse applied to the PL terminals of the counters via line 166. The offset values, therefore, bias the angle counter values in a direction determined by the up/down signal 354 so as to load the difference value into multiplexer 302 for display on the LCD.

The power up reset circuit 50 of FIG. 7 provides a short, active high pulse to initialize the electronics to the normal mode by providing a momentary high at the PL terminal of counter 418. When power is applied to terminal +V at C6, the full supply voltage is applied to oneinput of OR gate 420. A logic high is coupled from gate 420 to terminal PL, counter 418. As capacitor C6 charges, the voltage across R6 decreases until at the threshold level the reset pulse is no longer communicated to gate 420 and counter 418. When counter 418 is reset, the offset latch pulse enable and offset load enable outputs on lines 381 and 382 revert to a logic low, so that the LCD display is energized in the normal mode. The power up reset signal on line 266 is also communicated to D flip-flop 220 (FIG. 3) for initializing the LCD decimal point displays.

Referring now to FIG. 8, a circuit for monitoring the battery supply voltage is shown at 38. Typically, a standard 9.0 volt portable radio battery would be used to power the electronics. Resistor network R9, R10, R11 applies a bias to voltage detector 502. Detector 502 comprises a programmable votlage detector which is biased, for example, to sense when the battery voltage drops below 6.5 volts d.c. The output thereupon changes state from a logic high to a logic low, thus coupling the backplane 2 signal on line 156 through XOR gate 504 and inverter 506 to actuate the LO BAT segment of the LCD. The circuit shown provides optional hysteresis to avoid erratic output conditions due to changes in battery voltage with circuit loading and transient noise. The addition of hysteresis by the connection to HYST 2 makes the trip points slightly different for rising and falling inputs thereby avoiding unstable operation. A suitable device is the ICL7665, available from G.E. Intersil, 10900 N. Tantau, Ave., Cupertino, CA 95014.

The overrange circuit 26 is used to blank the digits of the LCD when the linear range of the sensor has been exceeded and to turn on the OVERRANGE annunciator on the LCD. The overrange circuit operates by sensing the relative pulse widths of the pulsed sensor interface output PW1 and reference pulse widths corresponding to the linear sensor range. Since the pulse width is a function of the sensor inclination, pulse width may be used as a measure of the departure from the allowable range of inclination. Timing modules 508 are 510 cooperate with appropriate resistor-capacitor combinations R7,C7 and R8, C8 to provide a monostable multivibrator circuit that will yield a desired time interval. In a typical application, R7 and C7 are selected to provide a pulse width of 1.9 ms corresponding to a pulse width PW1 at an inclination in a negative direction of slightly greater than −45°, are R8, C8 is selected to provide a pulse width of 6.1 ms which is slightly greater than a pulse width PW1 of 6.0 ms. corresponding to an inclination in a positive direction of slightly greater than +45°. Thus, modules 508 and 510 provide reference pulse widths corresponding to the minimum arc maximum allowable range of measurement. The values chosen are illustrative and not to be construed as limiting.

When the sensor is inclined at a negative angle greater than −45°, the pulse width PW1 will be of shorter duration than the pulse out from module 508. The pulse signal from module 508 is coupled through inverter 512 to the clock input of D flip-flop 516. A trigger pulse on line 164 initiates the one shot operation of module 508 and 510. Inverter 512 causes the clock pulse to go from logic low to logic high 1.9 ms after the trigger pulse. Since the sensor pulse is of shorter duration than the clock pulse and is applied to the data input, the data pulse will be zero when the flip-flop is toggled and the state of the flip flop will be changed on the rising edge of the clock pulse. Since Q was initially in a logic low state, when it is toggled by the clock signal, it becomes a logic high signal. This logic high is coupled to OR gate 520 and results in a logic high on overrange line 350.

Considering now module 510, since the reference maximum pulse width output of 6.1 ms is greater than the 1.9 ms output of the sensor, the data pulse applied to terminal D of flip-flop 518 falls to zero before the clock pulse is initiated. Consequently, flip-flop 518 is toggled so that the Q output to OR gate 520 remains at a logic low. The effect then is that module 508 is activated to energize the overrange line 350, representing an angular deflection of the sensor which exceeds the allowable minimum or negative angle deflection.

Conversely, for an angle greater than +45°, the pulse width on line 250 from the sensor will exceed the pulse width from module 508 and be less than the pulse width generated by module 510. Consequently, the roles of the flip-flops will be reversed from that described above, and the overrange line 350 will be activated by flip-flop 518, indicating that the sensor has been deflected beyond its allowable linear range in the maximum or positive angular direciton.

When overrange line 350 goes to a logic high, this causes multiplexer MX 302 of FIG. 6 to output an all ones count to the decoder drivers 304. This condition blanks the digits of LCD. The overrange signal on line 350 is applied to one input of XOR gate 522. The backplane 2 signal on line 156 is applied to a second input of the XOR gate. This effectively changes the phase of the output of gate 522 by 180° with respect to the backplane reference voltage, and therefore excites the OVERRANGE LCD annunciator to which it is coupled.

The LCD drivers of circuit 34 for the SET and ALT REF legends operate in a similar manner to that of the logic driving XOR gate 522. In the normal mode, the backplane 2 reference signal is applied to one input of XOR gates 526 and 528 and then applied to the display terminals. Consequently, the annunciators to which these gates are coupled are blanked, since there must be a phase difference between the backplane signal and the indicator terminal in order for the indicator to be active. In the set offset mode the offset latch pulse enable signal on line 382 is coupled to XOR gate 526 and the SET legend will be energized showing that the offset angle has been set. The offset latch pulse enable signal is simultaneously applied to one input of OR gate 524. Since the offset load enable signal on line 381 is a logic low during set offset, OR gate 521 transfers the logic high to XOR gate 528. Since the backplane 2 voltage is also applied to XOR gate 528, the result is again a phase inversion of the output, and the illumination of the ALT REF legend.

In the offset mode of operation, the offset latch pulse is returned to a logic low which extinguishes the SET indicator. However, since the offset load enable line 381 is now placed in a logic high condition, the logic high signal applied to XOR gate 528 results in an inversion of the backplane 2 signal, and therefore the ALT REF legend continues to remain illuminated. When the offset load enable signal is returned to a logic low for the normal mode, the ALT REF legend will be extinguished.

Figure 10:
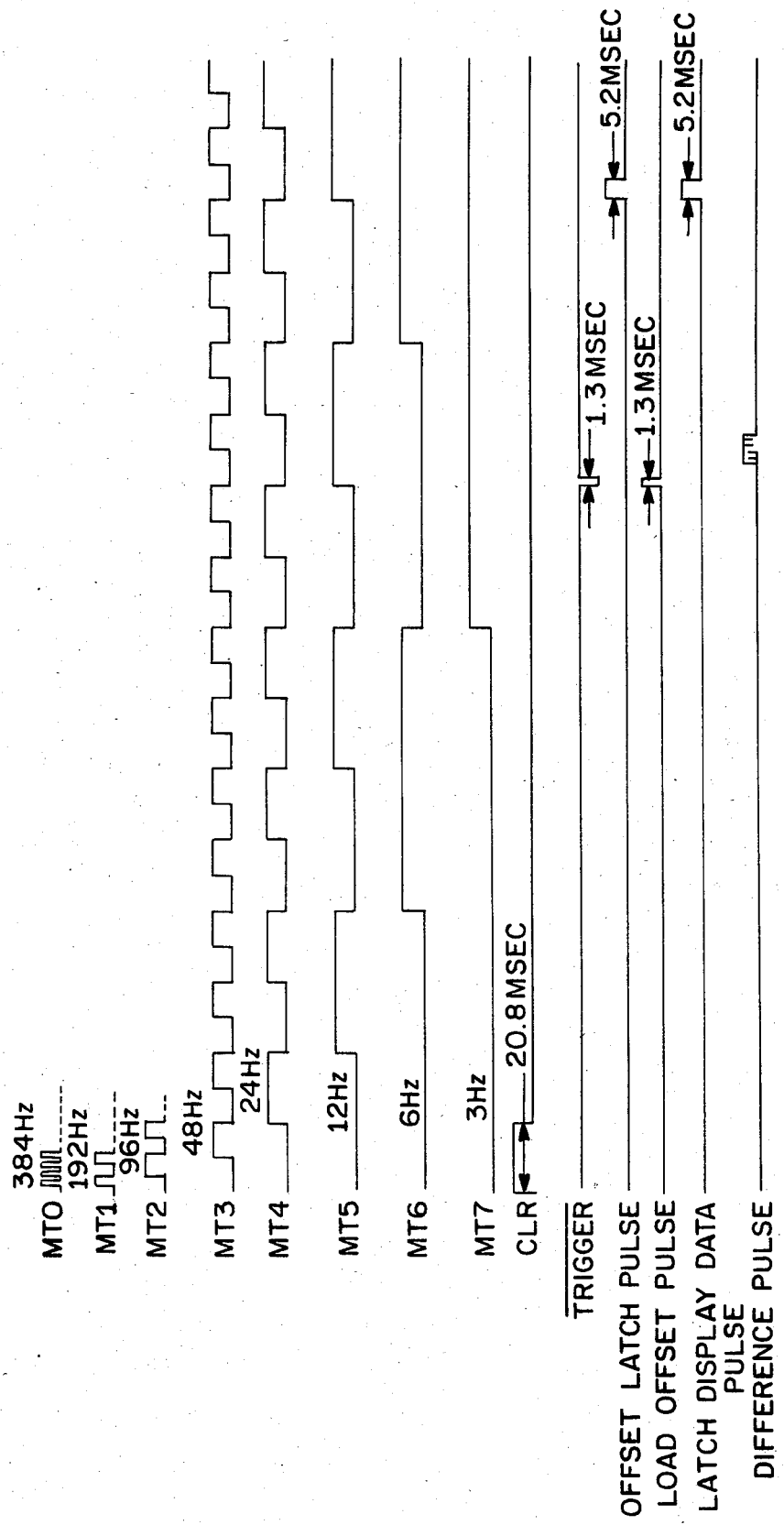
FIG. 10 is a timing diagram for a master timer circuit useful in the preferred embodiment of FIG. 1.

FIG. 9 shows the circuitry 28 for generating the various timing signals used in the invention, and FIG. 10 shows the signal waveforms resulting therefrom. The Figures show the generation of backplane reference voltage, the system clear pulse, the sensor trigger pulse, the offset latch pulse, the offset load pulse, and the latch display data pulse. Also shown in FIG. 10 are the output waveforms generated by the various divider circuits for combining to generate the desired control signals.

An astable R-C oscillator 100 is coupled to timing network R1,C1 for generating a square wave with a frequency of 768 Hz. Module 102 is a conventional binary counter which provides the following frequencies by dividing down from the clock input of 768 Hz:384 Hz, 96 Hz, and 48 Hz. The output of counter 102 is cascaded as an input to counter 104 which provides further output frequencies 24, 12, 6 and 3 Hz. These frequencies are used to provide the necessary timing signals shown in FIG. 10.

The 96 Hz output from counter 102 is applied to inverters 106 and 108 to establish backplane reference signals 1 and 2 for the liquid crystal display (LCD). They are also used in conjunction with the display driver circuitry of FIG. 8 to energize annunciator segments other than the digits of the LCD.

The system clear signals CLR1 and CLR2, are a logic high signal of approximately 20.8 ms in duration derived from OR gate 110 by combining the 24 Hz, 12 Hz, 6 Hz and 3 Hz pulses. Since the phase is inverted in logic elements 112 and 114, the signal is high for the first portion of every cycle.

The signal trigger is generated by using AND gate 120 for combining the 3 Hz, 12 Hz, and 6 Hz signal, inverted through logic element 116. This signal is used the clock for D flip-flop 122. A rising leading edge at the clock input forces output $\bar{Q}$ into a logic low state. The 384 Hz signal, MT0, delayed one-half cycle, is coupled to the reset terminal of flip-flop 122, and forces $\bar{Q}$ back into a logic high state, thus generating a 1.3 ms logic low pulse. The Q output is used as a drive signal to parallel load the offset reference angle into the angle generator 30. This signal is enabled by a logic high on line 381 to AND gate 124. Latch display data signal 168 is generated by D flip-flop 130 by driving the clock input by AND gate 118, which in turn is coupled to the 12, 6 and 3 Hz frequency outputs. A rising edge at the clock input forces the Q output to a logic high state. When the Q output is reset to a logic low state by signal MT2 going high and coupled through gate 126 to the reset input of flip-flop 130, the output is reset into a logic low state. This generates a 5.2 ms latch display data pulse. The offset latch pulse signal 170 is obtained by applying the latch display data signal 168 and offset latch pulse enable signal 382 to AND gate 132.

When a user wishes to hold an LCD reading, switch S1 may be depressed. So long as the switch is depressed, a logic high is applied by inverter 128 to one input of OR gate 126, which activates reset and inhibits any further latch display data pulses.

In operation, referring again to FIG. 1, the circuit is first set to operate in the normal mode. Assume for purposes of explanation that the degrees display has been selected and that the sensor 20 is inclined at an angle of +45°. The sensor pulse outputs are received by the scale factor oscillator 24 where a difference pulse is generated which is known from the foregoing discussion to be about 4.0 ms in duration. In the degrees display mode, the angle clock frequency is 112.5 kHz. In 4.0 ms, 450 clock pulses will be received by angle generator 30. The count 450 is applied to display driver 34 where it is decoded in a conventional manner for activating LCD 40. The digits 450 are thereby displayed on the LCD. The scale factor circuit 24 also activates the DP3 output so that DEG legend and appropriate decimal point are illuminated, resulting in an indication of 45.0 DEG.

If the scale factor select switch S2 is now actuated, for providing an output display in mils, the angle clock frequency is transferred to a 200 kHz rate. At 45.0°, in 4.0 ms 800 clock pulses will be received by angle generator 30. The DP2 driver, which is energized by the choice of the mils display, is used to drive the mils legend. The decimal point annunciator itself is tied to the backplane, so that it is not activated for this structure.

If it is desired to provide a display calibrated in in/ft, then the system is wired to utilize the optional scale factor clock of FIG. 4. At 45.0°, a 4.0 ms pulse will provide 936 clock pulses. For this display, the DP2 driver is activated, to display decimal point DP2 and the in/ft indicators. On depression of S2 to select the alternate display, which may be wired for either % grade or mm/M an alternate clock frequency of 198 kHz is selected. At 45.0°, a 4.0 ms pulse will generate 792 clock pulses. This results in a slight error from the mathematically exact figure of 785 pulses, due to the fact that the algorithm assumes the tangent of the grade angle is equal to the angle in radius. However, since in most cases a grade measurement will be limited to approximately 10% or less, the error will be minimal. For the % grade or mm/M display, the desired element is hardwired to receive a signal from the DP3 driver. The DP3 decimal point will also be illuminated for the % GRADE legend.

As the inclination angle of the sensor is changed, the corresponding pulse width outputs will increase or decrease depending on the direction and angle of inclination. The difference pulse generated in scale factor clock 24 will gate the selected angle clock frequency accordingly to provide a number of pulses to angle generator 30 which represents the sensed angle in the desired scale factor units. The output of the angle generator is then supplied to the display driver 34 in the manner previously described.

If it is desired to hold a particular reading for reference, switch S1 may be used to latch the displayed data into the display driver 34 via flip-flop 130. On again depressing the hold reading switch, the display will be returned to the normal active mode.

A sensed angle may be stored in memory 32 by depressing switch S3, which will actuate the select offset mode. The offset latch pulse thereby generated will latch the displayed angle into memory 32. Upon again depressing switch S3 to enter the offset mode, the stored values will be used to preset angle generator 30 by means of the offset load enable pulse, so that only a difference value will be displayed.

Upon again depressing the mode select switch, the apparatus will return to the normal mode.

The overrange detector 26 receives signals from the sensor interface 22 which are compared with internal pulse width references representative of the maximum and minimum allowable pulse widths for linear operation. When the comparison indicates that the allowable linear range has been exceeded, flip flop 516 or 518 will actuate the overrange output to decoder 304, resulting in blanking the LCD display and actuating the overrange annunciator.

In the event that the battery supply voltage is degraded beyond an allowable value set by the biases applied to voltage detector 502, the LO BAT annunciator will be illuminated. However, the system will not be inhibited from operation.

While the invention has been described in its preferred embodiments, it is to be understood that the words which have been used are words of decription rather than limitation and that changes may be made within the purview of the appended claims without departing from the true scope and spirit of the invention in its broader aspects.

We claim:

1. A digital display apparatus for use with a gravitational sensor providing pulse signals indicative of the algebraic sign and magnitude of inclination of said sensor with respect to a reference axis, comprising:
   (a) means for providing clock pulses,
   (b) means responsive to differences of pulse widths of said sensor signals for deriving a gating pulse representative of said magnitude,
   (c) divider means responsive to said clock pulses and said gating pulse for providing a first digital count signal representative of said magnitude and a predetermined scale factor,
   (d) gate means responsive to said sensor signals for providing a signal indicative of said sign of inclination, and
   (e) up/down counter means responsive to said first digital count signal,
   (f) said gate means also coupled to said up/down counter means for providing a gating pulse and incrementing or decrementing said counter means in accordance with said sensor signals.

2. The apparatus as set forth in claim 1 further comprising:
   (a) digital data storage means for storing correction factor signals representative of an angular displacement of said sensor from the earth's gravity vector,
   (b) means for providing said correction factor signals to said up/down counter means, and means for providing further correction factor signals to said digital storage means and for providing further digital count signals representative of the angular difference between said angular displacement and said sensor inclination to a digital display.

3. The apparatus as set forth in claim 2, further comprising display driver means coupled to receive said first and further digital count signals and said sign of inclination signal for providing said digital count and sign signals to said digital display.

4. The apparatus as set forth in claim 3 further comprising:
   (a) switch means for providing a control pulse for selecting a desired one of a plurality of scale factors,
   (b) oscillator means for generating said clock pulses at a frequency representative of said scale factor,
   (c) said divider means further comprised of first and second divider means responsive to said clock pulses, said gating pulse, and said control pulse for providing first and second digital count signals in accordance with ones of said plurality of scale factors,
   (d) latch means responsive to said switch means for selectively and sequentially addressing said first and second divider means, and
   (e) logic gate means, responsive to said first and second digital count signals, for providing one of said digital count signals in accordance with said control pulse.

5. The apparatus as set forth in claim 4, wherein
   (a) said first divider means is adapted for scaling said clock pulse to a first predetermined divisor, and for providing said first digital count signal in accordance therewith, and
   (b) said second divider means is adapted for scaling said clock pulse to a second predetermined divisor and for providing said second digital count signal in accordance therewith.

6. The apparatus as set forth in claim 5 wherein said means for providing a gating pulse comprises:
   (a) exclusive OR logic gate means having first and second inputs,
   (b) said inputs respectively coupled to receive first and second pulse signals from said sensor,
   (c) said logic gate means providing a logic high signal of duration proportional to differences in pulse widths of said first and second pulse signals, and
   (d) inverter means for converting said logic high signal to a logic low signal.

7. The apparatus as set forth in claim 6 wherein said first divider means comprises binary divider means having a first input for reception of said gating pulse, a second input for reception of said clock pulses, means for counting said clock pulses, and means for providing an output pulse representative of a predetermined fraction of a number of said clock pulses to provide said first digital count signal.

8. The apparatus as set forth in claim 5, wherein said second divider means provides a plurality of outputs, corresponding to fractions of said number of clock pulses, logic gate means for combining at least two of said outputs, and means responsive to a signal from said gate means for combining for selecting one of said corresponding fractions to provide said second digital count signal.

9. The apparatus as set forth in claim 5, further comprising:
   (a) means for providing a pulse of a first predetermined duration representing a maximum allowable inclination in a first direction,
   (b) means for providing a pulse of a second predetermined duration representing a maximum allowable inclination in an opposing direction,
   (c) logic switch means for receiving and comparing said pulses of said first and second duration with said sensor pulses and for deriving a first overrange signal when one of said sensor pulses has a duration greater than said pulse of first duration, and for deriving a second overrange signal when one of said sensor pulses has a duration less than said pulse of second duration, and
   (d) logic gate means for coupling one of said first and second overrange signals to said digital display for indicating an overrange condition.

10. The apparatus as set forth in claim 9 wherein:
    (a) said first pulse means comprises a first monostable multivibrator including timing means for establishing said first predetermined duration,
    (b) said second pulse means comprises a second monostable multivibrator including further timing means for establishing said second predetermined duration, and
    (c) further comprising means for receiving a trigger signal for synchronizing said first and second pulses of predetermined duration with said sensor pulses.

11. The apparatus as set forth in claim 10 wherein said logic switch means comprises first and second type D bistable multivibrators, each of said bistable multivibrators respectively coupled to receive one of said first and second pulses of predetermined duration and connected to receive at least portions of said sensor pulses, said multivibrators biased so that said associated timing means provides a clock signal and said sensor pulses provide a data signal, and said first and second bistable multivibrators provide output signals responsive to said data signal associated therewith when said clock signal actuates said multivibrators, said output signals comprising said overrange signals.

12. The apparatus as set forth in claim 11 wherein said logic gate means for coupling comprises OR gate means, having a first input coupled to receive output signals from said first bistable multivibrator and a second input coupled to receive output signals from said second bistable multivibrator, for providing an output indicative of an overrange condition when one of said bistable multivibrators is activated.

13. The apparatus as set forth in claim 3, further comprising:
(a) digital timing circuit means for generating a plurality of synchronous timing pulses,
(b) AND logic gate means for combining ones of said timing pulses to provide further clock pulses in accordance with a predetermined time interval representative of a desired update rate signal for said digital display,
(c) circuit means for generating a control pulse to inhibit said update rate signal and maintain an existing digital count on said digital display,
(d) OR logic gate means responsive to said inhibit control pulse and further ones of said timing pulses for providing a reset signal when energized by at least one of said inhibit control or further timing pulses,
(e) latch means responsive to said further clock pulses and said reset signal, for providing said update rate signal synchronous with said further clock pulses, and for inhibiting said update rate signal when energized by said inhibit control pulse, and
(f) means for coupling said update rate signal to said display driver means.

14. The apparatus as set forth in claim 13 wherein:
(a) said inhibit circuit means comprises first momentary switch contact means coupled to a source of dc potential and a phase inverter responsive to impulses from said first switch means, for providing a logic high output signal when said first switch means is deactivated and a logic low output signal when said first switch contact means is energized with said dc potential,
(b) said OR logic gate means having a first input coupled to receive said phase inverter output signals and a second input coupled to receive said further timing pulses for providing a logic high output signal when energized by a logic high signal applied to at least one of said first and second inputs, and
(c) said latch means comprises a type D bistable multivibrator, having a clock input coupled to receive said further clock pulses and a reset input coupled to receive said reset signal, biased to provide a logic high output signal when activated by said further clock pulses, and a logic low signal when deactivated by a logic high signal from said OR gate means, so that said latch provides a logic low signal so long as said first switch means is engaged with said dc potential, and is responsive to said further clock pulses and said reset signal when said first switch means is disengaged.

15. The apparatus as set forth in claim 14 wherein:
(a) said sensor signals comprise first and second pulse widths,
(b) said first pulse width has a duration exceeding said second pulse width when said sensor has a positive inclination with respect to an earth's gravity vector,
(c) said first pulse width has a duration less than said second pulse width when said sensor has a negative inclination, and further comprising:
(d) logic latch means responsive to said sensor signals, for comparing said pulse widths and providing an output signal indicative of the algebraic sign of said inclination.

16. The apparatus as set forth in claim 15 further comprising:
(a) further latch means responsive to said sensor signals and to signals derived from said update rate signal corresponding to said correction factor signals, for providing a first output signal representative of the algebraic sign of said correction factor signals and a second output signal representative of the inverse algebraic sign thereof,
(b) comparator means for receiving said first output signal and said derived update rate signals and providing output signals representative of differences and identity of the algebraic signs of said received signals,
(c) first multiplexer means for receiving said second output signal and signals derived from said first output signal, responsive to a control signal from said up/down counter means and from mode selection means, for selectively providing one of said received signals in response to said control signal, thereby to activate an algebraic legend disposed on said digital display, and
(d) second multiplexer means, coupled to receive said control signal applied to said first multiplexer means, responsive to a signal derived from said output signals of said comparator means and to a signal derived from a source of dc potential, for selectively providing one of said derived signals applied thereto to increment or decrement said up/down counter means in response to said control signal, wherein
(e) said control signal is representative of operational modes of said apparatus.

17. The apparatus as set forth in claim 16 wherein said operational modes are comprised of a normal, set offset, and offset mode.

18. The apparatus as set forth in claim 17 wherein said operational modes are determined by said mode selection means comprised of second momentary contact switch means coupled to a source of dc potential, bistable multivibrator means responsive to impulses from said second switch means, for providing logic state signals to programmable counter means, said programmable counter means providing further logic state signals corresponding to sequential impulses from said second switch means representative of said operational modes, said further logic signals applied to control said first and second multiplexer means.

19. The apparatus as set forth in claim 16, wherein said up/down counter means comprises:
(a) a digital counter, having an input coupled to receive said first digital count signal in serial form,
(b) means for providing an output signal representative of said first count signal in binary form coupled to digital data storage means for storing said first count signal in binary form, (c) means for applying said stored first count signal to further inputs of said up/down counter means, said inputs applied to bias said output signal in accordance with said derived signals from said second multiplexer means, and (d) means for receiving said derived signals from said second multiplexer means, thereby to increment or decrement said output in accordance with said derived signals and said stored count signal.

20. The apparatus as set forth in claim 19 wherein:

(a) said control signal from said up/down counter means is provided by further OR gate logic means, coupled to receive said count signal in binary form, and responsive to binary digits of said count signal, said further gate logic means providing a logic high when energized by a binary digit and a logic low when all said digits are a null, and further comprising:

(b) means for coupling an output signal from said further or gate logic means representative of a logic state thereof to bistable multivibrator means, said multivibrator means coupled to provide said control signal corresponding to said logic state to said first and second multiplexer means.

21. The apparatus as set forth in claim 20 further comprising:

(a) further multiplexer means, comprised of a plurality of cascaded multiplexers, have a first input coupled to receive said count signal in binary form, (b) a second input coupled to a source of d.c. potential for providing a logic high signal thereto, (c) a third input for receiving a signal indicative of an overrange condition, (d) an output for receiving signals selectively coupled from said first or second inputs, (e) means responsive to said overrange signal for coupling said logic high signal to said output, and (f) means for coupling said count signal to said output.

22. The apparatus as set forth in claim 21 further comprising decoder/driver means, coupled to receive signals from said further multiplexer means indicative of said magnitude of inclination.

* * * * *